United States Patent [19]

Tozawa et al.

[11] Patent Number: 5,603,786
[45] Date of Patent: Feb. 18, 1997

[54] PNEUMATIC TIRE WITH 1×2 STEEL BELT CORDS

[75] Inventors: Yukio Tozawa; Susumu Imamiya, both of Hiratsuka; Hiroyuki Kaido, Yokohama; Hisao Kato; Issei Nakakita, both of Hiratsuka, all of Japan

[73] Assignee: The Yokohama Rubber Co., Ltd., Tokyo, Japan

[21] Appl. No.: 460,833

[22] Filed: Jun. 5, 1995

Related U.S. Application Data

[63] Continuation of Ser. No. 376,309, Jan. 23, 1995, abandoned, which is a continuation of Ser. No. 101,290, Aug. 3, 1993, abandoned, which is a continuation of Ser. No. 707,760, May 30, 1991, abandoned.

[30] Foreign Application Priority Data

Jun. 13, 1990 [JP] Japan .................................. 2-152647

[51] Int. Cl.$^6$ .............................. B60C 9/18; B60C 9/20
[52] U.S. Cl. ........................ 152/527; 152/526; 152/537
[58] Field of Search .............................. 152/451, 526, 152/527, 537; 57/902

[56] References Cited

U.S. PATENT DOCUMENTS

| | | | |
|---|---|---|---|
| 3,406,733 | 10/1968 | Boileau | 152/547 X |
| 3,513,898 | 5/1970 | Lugli et al. | 152/526 X |
| 4,749,017 | 6/1988 | Loesch | 152/527 C |
| 4,819,705 | 4/1989 | Caretta | 152/527 |
| 5,014,760 | 5/1991 | Bombeke et al. | 152/451 |
| 5,061,557 | 10/1991 | Kot et al. | 152/527 X |

FOREIGN PATENT DOCUMENTS

| | | | |
|---|---|---|---|
| 4119249 | 12/1991 | Germany | 152/527 |
| 6218303 | 1/1987 | Japan | 152/526 |
| 62-117893 | 5/1987 | Japan . | |
| 390402 | 4/1991 | Japan | 152/527 |

OTHER PUBLICATIONS

*Mechanics of Pneumatic Tires*, ed. Samuel Clark, US Dept. of Transportation, Aug. 1981, p. 881.

*Primary Examiner*—Adrienne C. Johnstone
*Attorney, Agent, or Firm*—Finnegan, Henderson, Farabow, Garrett & Dunner

[57] ABSTRACT

A pneumatic tire having improved rolling resistance and increased resistance to separation between coat rubber and steel cords embedded therein. The steel cord is formed from two intertwisted steel filaments containing 0.80–0.92 weight percent of carbon. The rubber coat has 100% elastic modulus of 35–55 kg/cm$^2$. Each of the cords and the rubber coat has a specified mean cross-sectional area (Sa, Sb). The cords are spaced apart from each other by a specified distance across the junction of adjacent belts.

2 Claims, 2 Drawing Sheets

PNEUMATIC TIRE WITH 1×2 STEEL BELT CORDS

This application is a continuation of application Ser. No. 08/376,309 filed Jan. 23, 1995, now abandoned, which is a continuation of application Ser. No. 08/101,290, filed Aug. 3, 1993, now abandoned, which is a continuation of Ser. No. 07/707,760, filed May 30, 1991, now abandoned.

BACKGROUND OF THE INVENTION

1. Field of the Invention

This invention relates to pneumatic tires having their belts reinforced with steel cords.

2. Prior Art

Steel wire cords are known to be superior to cords of other materials in respect of physical strength and hence find extensive application inter alia as tire belt reinforcing elements particularly for the tread portion which is subject to the most severe load burden. Steel cords however are disadvantageously large in specific gravity, leading to increased weight of product tires counter to the automobile industry policy of providing lighter cars to reduce the resistance of rolling along the roadway and hence to save fuel consumption.

Flexibility or suppleness of the tire constituent parts is an important factor to cope with sagging behavior of the tire while rolling on the roadway. Steel cords in the belts of the tire may be theoretically preferably formed from as many steel filaments twisted together as is feasible to provide increased flexibility. This will however result in increased empty spaces or voids formed in the strands of the filaments extending longitudinally along the axis of the cord, and consequently air and moisture penetrate into the voids, causing corrosion or rust of the cord. With most advanced automobile tires, therefore, there are used a minimal number of two steel filaments twisted together.

Steel cord strength would decline if the total cross sectional surface area of the cord is reduced in an attempt to reduce the tire weight. With this in view, it has been proposed to use a steel cord consisting of two intertwisted filaments of a high tension steel having high carbon contents as disclosed for example in Japanese Laid-Open Patent Publication No. 62-117893, in which instance the amount of the rubber used to coat or embed the cords therein is increased so as to restrain separation between the coating rubber and the cords notably at the marginal ends of the belts as cross-sectionally observed. However, the higher the modulus of the coat rubber, the less flexibility is available for the belts, rendering the cords susceptible to breakage or rupture. On the other hand, increasing the weight of the coat rubber will literally increase the tire weight and its rolling resistance.

SUMMARY OF THE INVENTION

With the foregoing problems of the prior art in view, the present invention seeks to provide an automobile tire having a steel cord belted structure which is relatively light in weight, with reduced rolling resistance and immune to separation between the cord and the coat rubber layer at the belt marginal ends and hence to cord breakage or rupture.

These advantageous features are achieved by the provision of a pneumatic automobile tire comprising a plurality of belt layers each having steel cords embedded in a coat rubber, characterized in that each of the steel cords is formed from two intertwisted steel filaments containing 0.80–0.92 weight percent of carbon; the steel cords are spaced 0.6–0.9 mm (t) apart from each other between adjoining belt layers; the coat rubber has 100% elastic modulus of 35–55 kg/cm$^2$; the steel cords have a a diameter (d) and a mean cross-sectional area (Sa) of 0.10–0.15 mm$^2$ per 1 mm unit of cross-sectional width of the belt layer; and the coat rubber has a mean cross-sectional area (Sb) of 1.00–1.45 mm$^2$ per 1 mm cross-sectional width of the belt layer having a thickness equal to (d)+(t).

The above object and other features of the invention will appear manifest from the following detailed description taken in conjunction with the accompanying drawings which illustrate by way of example a preferred embodiment.

DETAILED DESCRIPTION OF THE INVENTION

Figure 1:
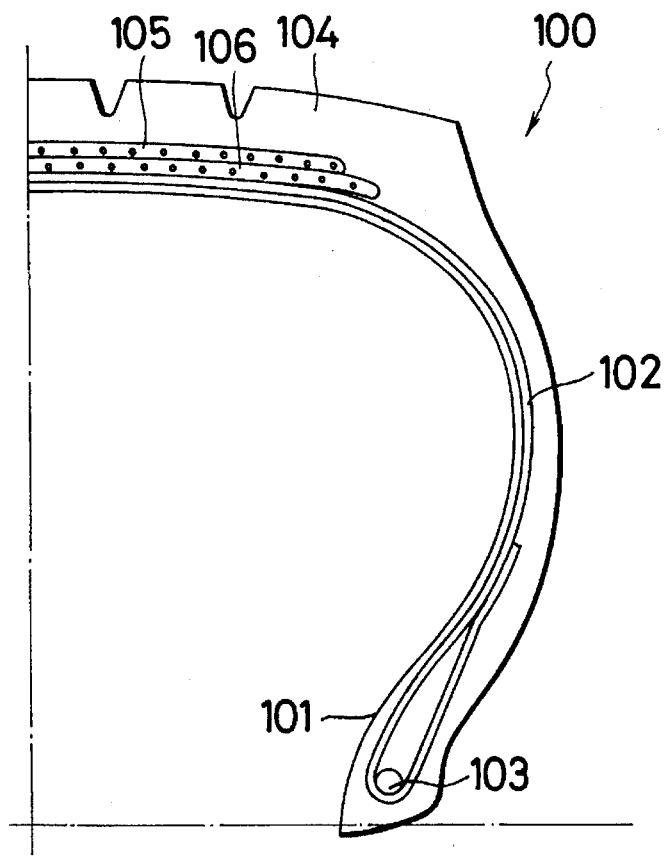
FIG. 1 is a schematic diagram illustrating a cross-sectional view taken in half part along the meridian line of a tire.

Referring to the drawing and FIG. 1 in particular, there is shown a pneumatic automobile tire 100 comprising a pair of bead portions 101, a carcass 102 folded outwardly about a bead core 103, a tread 104 and outer and inner belts 105 and 106 extending between the carcass 102 and the tread 104 circumferentially around the tire 100. The number of belt layers 105 and 106 is shown, though not exclusively, to be two in the present embodiment.

Figure 2:
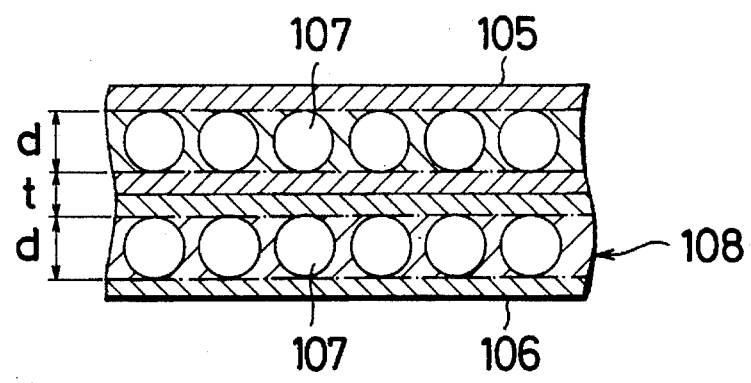
FIG. 2 is a schematic cross-sectional view on enlarged scale of a belt portion of the tire.

The belts 105 and 106 each comprise a plurality of steel cords 107 embedded in a sheet of rubber or coat rubber 108 as better shown in FIG. 2.

Each steel cord 107 is composed of two intertwisted filaments of high tension steel containing 0.80–0.92 weight percent of carbon. Carbon contents smaller than 0.80 weight percent will contribute to reduction in the filament strength. Greater carbon contents than 0.92 weight percent will render the filaments stiff and difficult to be drawn.

The coat rubber 108 has 100% elastic modulus in the range of 35–55 kg/cm$^2$. Moduli smaller than 35 kg/cm$^2$ are widely departing from the modulus of the cords 107 and would contribute to separation between the cords 107 and the coat rubber 108 in the belts 105, 106. Moduli exceeding 55 kg/cm$^2$ would result in broken cords.

Another factor associated with cord-rubber separation and cord breaking is the rate of occupancy (end counts) of the steel cord 107 and that of the coat rubber 108. The end count for the cord 107 is represented by a mean cross-sectional area Sa in mm$^2$ of steel cord 107 in 1 mm unit of cross-sectional width of the belt layer, the cords having a diameter (d) as shown in FIG. 2. This value Sa is specified at 0.10 mm²–0.15 mm² according to the invention. This value of Sa is calculated as follows:

$$Sa = f \times \pi \times \left(\frac{d_f}{2}\right)^2 \times N$$

where f=number of filaments/cord;

$d_f$=diameter of a filament in mm;

N=number of cords in 50 mm of belt width.

The mean cross-sectional area Sb in mm² of the coat rubber in 1 mm of cross sectional width of a belt is specified at 1.00 mm² to 1.45 mm² and can be conveniently computed from the formula Sb=(t+d)×1−Sa where t is the cord to cord spacing and d is the diameter of the steel cord. The term "mean cross-sectional area" is used to designate a cross sectional area averaged out of a plurality of, preferably five sampling spots of a given tire belt.

As shown in FIG. 2 t is the cord-to-cord spacing across the junction of adjoining belt layers 105 and 106 which is specified herein to be in the range of 0.6 mm and 0.9 mm which is optimal in tire performance and desirable in holding the use of rubber to a minimum to reduce the tire weight.

Table 1 shows a total of nine different test tires and one control that were tested for tire performance under a set of conditions set forth below.

Belt Separation Test

This test was conducted on an indoor drum rotating at 60 km/hr. for 100 hours with air pressure of 1.7 kg/cm², rim of 5.5 J, slip angle of ±3° and varied load of 390±130 kgf. Belt-to-cord separation was checked by measuring the amount of belt interlayers separated from belt end toward belt center. Values less and more than 2 mm denote good "◯" and bad "X", respectively.

Cord Break Test

This test was conducted on an indoor drum rotating at 25 kg/hr. for 40 hours with air pressure of 1.4 kg/cm², rim of 5.5 J, slip angle of ±4° and varied load of 400±200 kgf. Numbers of broken cords less and more than 3 denote good "◯" and bad "X" respectively From the test results shown in Table 1, it will be noted that less than 0.10 mm of the value Sa (which represents a mean cross-sectional area of steel cord per 1 mm unit cross-sectional width corresponding to the diameter d of steel cord) is indicative of increased cord break tendency and more than 0.15 mm² Sa is responsible for tire weight increase and hence deteriorated rolling resistance.

Figure 3:
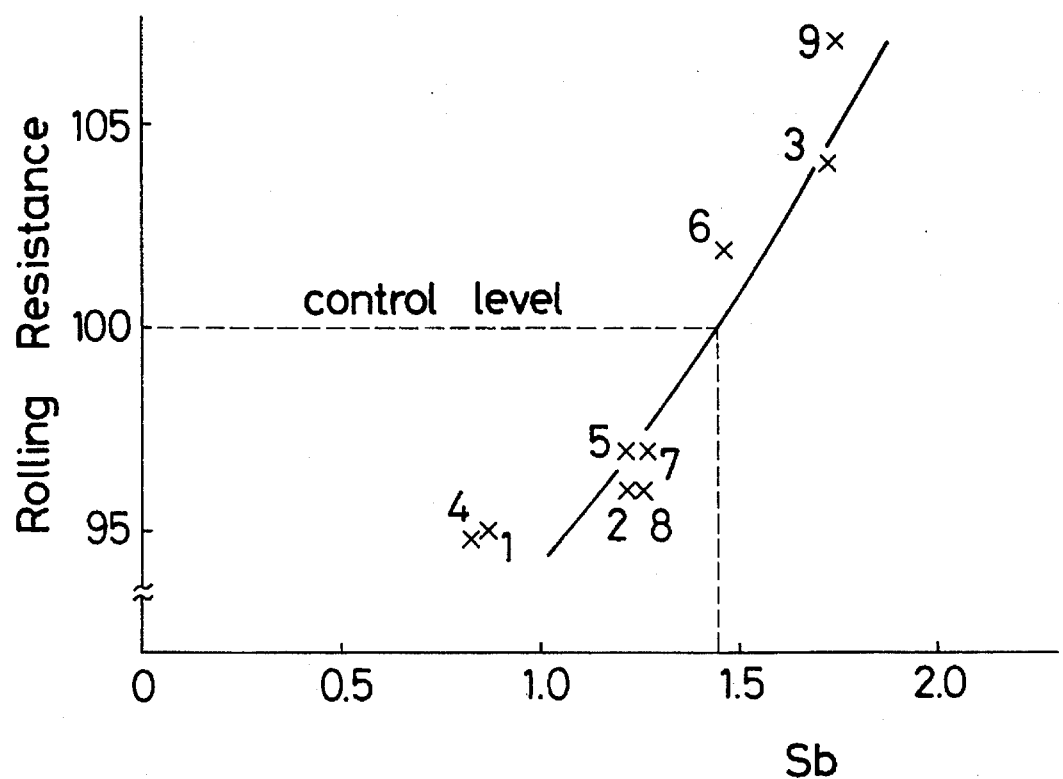
FIG. 3 is a graph showing the rolling resistance of the tire plotted against a mean cross-sectional area of the coat rubber.

The graph of FIG. 3 plotting the test results from Table 1 demonstrates improved rolling resistance with the value Sb ranging between 1.00 mm² and 1.45 mm², where Sb represents a mean cross-sectional area of the coat rubber per 1 mm cross-sectional width of the belt layer. The numerals plotted in FIG. 3 are the Run Number of tires appearing in Table 1.

TABLE 1

| | Run No. | | | | | | | | | |
|---|---|---|---|---|---|---|---|---|---|---|
| | control | 1 | 2 | 3 | 4 | 5 | 6 | 7 | 8 | 9 |
| steel cord structure | 2 + 2 (0.25) | 1 × 2 (0.30) | 1 × 2 (0.30) | 1 × 2 (0.30) | 1 × 2 (0.30) | 1 × 2 (0.30) | 1 × 2 (0.30) | 1 × 2 (0.30) | 1 × 2 (0.28) | 1 × 2 (0.30) |
| steel cord diameter (d) mm | 0.60 | 0.60 | 0.60 | 0.60 | 0.60 | 0.60 | 0.60 | 0.60 | 0.56 | 0.60 |
| end counts/50 mm | 39 | 49 | 49 | 49 | 49 | 49 | 49 | 32 | 45 | 56 |
| (Sa) mm²/mm | 0.15 | 0.14 | 0.14 | 0.14 | 0.14 | 0.14 | 0.14 | 0.09 | 0.11 | 0.16 |
| cord-to-cord spacing (t) mm | 1.00 | 0.40 | 0.75 | 1.25 | 0.40 | 0.75 | 1.00 | 0.75 | 0.75 | 1.30 |
| (Sb) mm²/mm | 1.45 | 0.86 | 1.21 | 1.71 | 0.85 | 1.21 | 1.46 | 1.26 | 1.24 | 1.74 |
| 100% modulus of coat rubber kg/cm² | 70 | 45 | 45 | 45 | 70 | 70 | 70 | 45 | 45 | 45 |
| rolling resistance | 100 | 95 | 96 | 104 | 95 | 97 | 102 | 97 | 96 | 107 |
| belt separation | ◯ | X | ◯ | ◯ | ◯ | ◯ | ◯ | ◯ | ◯ | X |
| cord break | ◯ | X | ◯ | ◯ | X | X | ◯ | X | ◯ | ◯ |

Note: -
◯: good
X: bad

Tire Specification

| Tire size | 195/70 R14 |
|---|---|
| Belt structure | As shown in FIG. 1 |
| Steel cord | Carbon content 0.82 weight percent. Twist pitch 14.5 mm. |

Rolling Resistance Test

This test was conducted on a rotary drum running at 80 km/hr. with tire air pressure of 1.9 kg/cm², rim of 5.5 J and load of 520 kgf. Test results are better with smaller values relative to an index of 100 for control tire.

What is claimed is:

1. A pneumatic automobile tire comprising a tread portion extending in a circumferential direction and at least two superimposed rubber belt layers extending circumferentially adjacent to and beneath said tread portion, each belt layer comprising a row of a plurality of steel cords embedded in a coating rubber, each steel cord having a diameter d in mm and consisting of two intertwisted steel filaments each of which contains 0.80–0.92 weight percent of carbon, said rows of steel cords in adjoining belt layers being spaced apart from each other a distance t of from 0.6 to 0.9 mm and said coat rubber having a 100% elastic modulus of 35 to 55 kg/cm², the mean cross-sectional area Sa of the cords in 1 mm unit of cross-sectional width of a belt layer being from 0.10 to 0.15 mm² and the mean cross-sectional area Sb of the coat rubber in 1 mm unit of cross-sectional width of a belt layer having a thickness equal to d+t being from 1.00 to 1.45 mm².

2. The pneumatic automobile tire of claim 1, wherein said at least two superimposed rubber belt layers consist of two belt layers.

* * * * *